United States Patent
Satpathy et al.

(10) Patent No.: US 12,200,130 B1
(45) Date of Patent: Jan. 14, 2025

(54) ROM INSTRUCTION AUTHENTICATION AND INTEGRITY VERIFICATION FOR ARTIFICIAL REALITY SECURITY CONTROLLER

(71) Applicant: Meta Platforms Technologies, LLC, Menlo Park, CA (US)

(72) Inventors: Sudhir Satpathy, Redmond, WA (US); Wojciech Stefan Powiertowski, Kirkland, WA (US); Nagendra Gupta Modadugu, San Francisco, CA (US); Neeraj Upasani, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 432 days.

(21) Appl. No.: 17/248,066

(22) Filed: Jan. 7, 2021

Related U.S. Application Data

(60) Provisional application No. 63/199,464, filed on Dec. 30, 2020.

(51) Int. Cl.
*H04L 9/32* (2006.01)
*G06F 1/16* (2006.01)
(Continued)

(52) U.S. Cl.
CPC ............ *H04L 9/3226* (2013.01); *G06F 1/163* (2013.01); *G06F 3/14* (2013.01); *G06F 21/52* (2013.01);
(Continued)

(58) Field of Classification Search
CPC ... H04L 9/3226; H04L 9/3247; H04L 9/0866; G06F 1/163; G06F 3/14; G06F 21/52;
(Continued)

(56) References Cited

U.S. PATENT DOCUMENTS

| | | | | |
|---|---|---|---|---|
| 3,277,447 A | * | 10/1966 | Newman | G11C 21/026 |
| | | | | 711/E12.019 |
| 3,454,932 A | * | 7/1969 | Bahrs | G06F 9/355 |
| | | | | 712/E9.042 |

(Continued)

FOREIGN PATENT DOCUMENTS

| | | | | |
|---|---|---|---|---|
| CN | 103329500 A | * | 9/2013 | ............... H04L 9/08 |
| JP | H05151087 A | * | 6/1993 | |

(Continued)

OTHER PUBLICATIONS

Kirk H.M. Wong, Patrick C.L. Hui, Allan C.K. Chan; (Cryptography and authentication on RFID passive tags for apparel products); pp. 8; Nov. 21, 2005.*

(Continued)

*Primary Examiner* — Harunur Rashid
*Assistant Examiner* — Ali H. Cheema
(74) *Attorney, Agent, or Firm* — Potomac Law Group, PLLC; Dannon G. Allbee

(57) ABSTRACT

Systems, methods, and devices authenticate processor instructions stored by a read-only memory (ROM). In one example, a ROM stores a block of register words. The block of register words includes a first register word specifying an authentication tag and one or more register words that each specify an instruction. A security controller identifies the first register word as specifying the authentication tag and performs authentication of the authentication tag. Upon successfully authenticating the authentication tag, the security controller forwards the register words that each specify instructions to a processor for execution. Upon unsuccessfully authenticating the authentication tag, the security controller blocks the register words that each specify instructions from execution by the processor.

20 Claims, 8 Drawing Sheets

(51) Int. Cl.
*G06F 3/14* (2006.01)
*G06F 21/52* (2013.01)
*G06F 21/64* (2013.01)

(52) U.S. Cl.
CPC .......... *G06F 21/64* (2013.01); *H04L 9/3247* (2013.01); *G06F 2221/033* (2013.01)

(58) Field of Classification Search
CPC .. G06F 21/64; G06F 21/602; G06F 2221/033; G06F 2221/032
USPC ........................................................ 713/189
See application file for complete search history.

(56) References Cited

U.S. PATENT DOCUMENTS

| | | | | |
|---|---|---|---|---|
| 4,425,615 | A * | 1/1984 | Swenson | G06F 12/0866 |
| | | | | 711/E12.019 |
| 5,249,231 | A * | 9/1993 | Covey | G06F 12/1466 |
| | | | | 713/193 |
| 5,828,896 | A * | 10/1998 | Caudel | G06F 15/7842 |
| | | | | 712/E9.055 |
| 5,941,980 | A * | 8/1999 | Shang | G06F 9/30152 |
| | | | | 712/213 |
| 6,549,903 | B1 * | 4/2003 | Babaian | G06F 21/64 |
| | | | | 707/999.009 |
| 7,012,717 | B1 * | 3/2006 | Easwar | H04N 1/40087 |
| | | | | 358/1.9 |
| 7,191,335 | B1 * | 3/2007 | Maillard | H04N 21/4181 |
| | | | | 380/42 |
| 7,272,704 | B1 * | 9/2007 | Nguyen | G06F 9/3804 |
| | | | | 712/241 |
| 7,379,548 | B2 * | 5/2008 | Revital | H04N 7/165 |
| | | | | 380/240 |
| 8,677,147 | B2 * | 3/2014 | Robyr | H04N 21/4622 |
| | | | | 713/150 |
| 9,058,297 | B2 * | 6/2015 | Ducharme | H04N 21/4181 |
| 2002/0004897 | A1 * | 1/2002 | Kao | G06F 9/3017 |
| | | | | 712/209 |
| 2003/0191897 | A1 * | 10/2003 | Kao | G06F 9/3802 |
| | | | | 712/E9.055 |
| 2004/0168063 | A1 * | 8/2004 | Revital | H04N 21/4623 |
| | | | | 713/172 |
| 2005/0149521 | A1 * | 7/2005 | Wang | G06F 9/30076 |
| | | | | 712/E9.046 |
| 2005/0177741 | A1 * | 8/2005 | Chen | H04N 21/26613 |
| | | | | 726/1 |
| 2006/0182135 | A1 * | 8/2006 | Pisek | G06F 9/30145 |
| | | | | 370/406 |
| 2009/0080646 | A1 * | 3/2009 | Yen | H04L 9/3236 |
| | | | | 708/492 |
| 2010/0027783 | A1 * | 2/2010 | Yup | H04L 9/0631 |
| | | | | 380/44 |
| 2010/0260476 | A1 * | 10/2010 | Cloutman | G06F 21/10 |
| | | | | 348/E5.062 |
| 2013/0279691 | A1 * | 10/2013 | Chen | H04N 21/4181 |
| | | | | 380/44 |
| 2015/0058997 | A1 * | 2/2015 | Lee | G06F 9/45558 |
| | | | | 726/26 |
| 2015/0149723 | A1 * | 5/2015 | Lin | G06F 12/0875 |
| | | | | 711/123 |
| 2016/0164802 | A1 * | 6/2016 | Liu | H04H 60/73 |
| | | | | 370/437 |
| 2017/0177368 | A1 * | 6/2017 | DeHon | G06F 21/6218 |
| 2017/0243319 | A1 * | 8/2017 | Wittenbrink | G06T 15/00 |
| 2017/0345019 | A1 * | 11/2017 | Radocchia | H04W 12/10 |
| 2018/0019877 | A1 * | 1/2018 | Koo | H04L 63/061 |
| 2019/0213322 | A1 * | 7/2019 | Dehon | G06F 9/4401 |
| 2021/0011556 | A1 | 1/2021 | Atlas et al. | |
| 2022/0121738 | A1 * | 4/2022 | DeHon | G06F 21/79 |

FOREIGN PATENT DOCUMENTS

| | | | | |
|---|---|---|---|---|
| JP | H0642228 B2 * | 6/1994 | .......... | G06F 15/025 |
| JP | 2002229776 A * | 8/2002 | ......... | G06F 13/4063 |
| TW | 538374 B * | 6/2003 | | |

OTHER PUBLICATIONS

Boyeon Song and Chris J Mitchell; (RFID Authentication Protocol for Low-cost Tags); pp. 8; Mar. 31-Apr. 2, 2008.*
"Announcing the Advanced Encryption Standard (AES)," Federal Information Processing Standards Publication 197, Nov. 26, 2001, 51 pp.
"SMS4 Encryption Algorithm for Wireless Networks," Version 1.03, May 15, 2008, 6 pp. (translated by Diffie et al.).
Aoki et al., "Specification of Camellia—a 128-bit Block Cipher," NTT and Mitsubishi Electric Corporation, Sep. 26, 2001, 35 pp.
U.S. Appl. No. 16/795,254, filed Feb. 19, 2020, naming inventors Clark-Lindh et al.
U.S. Appl. No. 16/749,283, filed Jan. 22, 2020, naming inventors Satpathy et al.
U.S. Appl. No. 17/009,512, filed Sep. 1, 2020, naming inventors Yardi et al.

* cited by examiner

ROM INSTRUCTION AUTHENTICATION AND INTEGRITY VERIFICATION FOR ARTIFICIAL REALITY SECURITY CONTROLLER

This application claims the benefit of U.S. Provisional Application No. 63/199,464, which was filed on Dec. 30, 2020 and which the entire contents thereof is incorporated herein by reference.

TECHNICAL FIELD

This disclosure generally relates to authenticating and/or verifying executable instructions stored in programmable hardware of various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g. wirelessly or in tethered fashion) to a peripheral device that performs one or more artificial reality-related functions.

SUMMARY

In general, the disclosure describes techniques for authenticating processor instructions stored by programmable hardware (e.g., a read-only memory (ROM)) of a System on a Chip (SoC) integrated circuit of a device within an artificial reality system, such as within an HMD or a peripheral device. For example, a ROM stores executable instructions within hardware-based programmable memory registers organized into memory regions, which each memory region of a memory register being referred to herein as a register word. For example, a ROM may be organized into a plurality of "registers," each register storing a register word (or register value) that is a fixed length of bits. As described herein, a group of such register words referred to as a "block" of register words. In one example described herein, a block of register words includes a first register word specifying an authentication tag and one or more register words that each specify an instruction. The authentication tag, for example, may represent a cryptographic tag or key that may be used to authenticate the block of register words (e.g., verify a source of the register words and/or verify that an attacker has not modified or tampered with the block of register words). Each instruction represents a programmable instruction executable by a processor of the AR system. As described, security controller is configured to determine that the first register word specifies the authentication tag and, in response, performs cryptographic authentication of the authentication tag. The security controller may use cryptographic authentication of the authentication tag to verify that the authentication tag (and by implication, the associated block of register words) originates from an authorized source (e.g., an authorized manufacturer, developer, etc.). Additionally, the security controller may use cryptographic authentication of the authentication tag to verify that an attacker has not tampered with or modified the authentication tag and/or the associated block of register words. Upon successfully authenticating the authentication tag, the security controller forwards the register words that each specify instructions to a processor for execution. Upon failing to authenticate the authentication tag, the security controller blocks or otherwise prevents the register words that each specify instructions from execution by the processor.

The techniques of the disclosure may provide specific improvements to the computer-related field of processor instruction authentication that have practical applications. For example, the techniques disclosed herein may enable an SoC to cryptographically authenticate instructions prior to execution of such instructions by a processor for the SoC. Furthermore, the techniques of the disclosure may enable cryptographic authentication of instructions without imposing a large latency on the execution of instructions by the processor. Additionally, the techniques of the disclosure may enable an SoC to use dynamically-defined authentication tags stored by the ROM to authenticate instructions for execution, thereby enabling the SoC to maintain the ability to authenticate the instructions even after reprogramming the ROM, such as after software updates to the instructions stored by the ROM. Furthermore, the techniques of the disclosure may enable an SoC to implement a flexible authentication scheme of instructions, thereby allowing the SoC to perform authentication of individual subroutines stored in the ROM, chain authentication of multiple authentication tags stored in the ROM, and bypass authentication of subroutines stored in the ROM.

In one example, this disclosure describes an SoC comprising: a ROM configured to store a block of register words, wherein the block of register words comprises a first register word specifying an authentication tag and one or more register words that each specify an instruction; a security controller configured to: identify the first register word as specifying the authentication tag; in response to identifying the first register word as specifying the authentication tag, perform cryptographic authentication of the authentication tag to verify at least one of an integrity or a source of the block of register words; and in response to successfully performing authentication of the authentication tag, forward the one or more register words that each specify an instruction for execution by the processor; and the processor configured to execute the one or more register words received from the security controller.

In another example, this disclosure describes a method comprising: storing, in a ROM of an SoC, a block of register words, wherein the block of register words comprises a first register word specifying an authentication tag and one or more register words that each specify an instruction; identifying, by a security controller of the SoC, the first register word as specifying the authentication tag; in response to identifying the first register word as specifying the authentication tag, performing, by the security controller, cryptographic authentication of the authentication tag to verify at least one of an integrity or a source of the block of register words; in response to successfully performing authentication of the authentication tag, forwarding, by the security controller, the one or more register words that each specify an instruction for execution by the processor; and executing, by processor, the one or more register words received from the security controller.

In another example, this disclosure describes a head-mounted display comprising: an SoC comprising: a ROM configured to store a block of register words, wherein the block of register words comprises a first register word specifying an authentication tag and one or more register words that each specify an instruction; a security controller configured to: identify the first register word as specifying the authentication tag; in response to identifying the first register word as specifying the authentication tag, perform cryptographic authentication of the authentication tag to verify at least one of an integrity or a source of the block of register words; and in response to successfully performing authentication of the authentication tag, forward the one or more register words that each specify an instruction for execution by the processor; and the processor configured to execute the one or more register words received from the security controller.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Programmable hardware, such as a read-only memory (ROM), stores instructions for execution by a microprocessor (also referred to herein as a "processor" or "processing circuitry") to, e.g., bootstrap an operating system for a computing device, such as an artificial reality (AR) head mounted display (HMD). It is important to ensure that the ROM is secure to prevent unauthorized tampering, such as execution of unauthorized code. However, encrypting or hashing the instructions stored in the ROM is computationally complex, power intensive, and may add noticeable latency to execution of the instructions by the microprocessor.

In accordance with some example techniques of the disclosure, a security controller for an SoC uses a hardware-based authentication tag pipeline to efficiently verify the integrity of the instructions stored within the ROM using authentication tags stored within the ROM in-line with executable instructions. The ROM may, in some examples, organize a plurality of register words into blocks. Each block includes a first register word specifying an authentication tag and one or more register words that each specify an instruction.

As described, the security controller retrieves blocks of register words from the ROM in pipelined fashion and, for each block, identifies the register word specifying the corresponding authentication tag. The security controller performs cryptographic authentication of the authentication tag to authenticate the block of instructions. For example, the security controller may perform cryptographic authentication of the authentication tag to verify an integrity of the block of instructions so as to ensure that an attacker has not modified or tampered with the block of instructions. As another example, the security controller may perform cryptographic authentication of the authentication tag to verify a source of the block of instructions so as to ensure that the block of instructions originated from a source (e.g., a person or entity) that is authorized to provide instructions to the processor for execution. In some examples, the authentication tag is a digital signature created with a private cryptographic key that the security controller may cryptographically authenticate with a corresponding public cryptographic key. If the security controller validates the authentication tag (and by implication, the block of instructions), the security controller sends the block of instructions to the microprocessor for execution. If the security controller does not validate the block, the security controller may block the block of instructions from execution, generate an interrupt request to stop execution by the device, execute alternate code, perform a factory reset of the chip, etc. Blocks of stored instructions are processed from the ROM in pipelined fashion for accelerating authentication and verification of the executable instructions stored by the ROM.

Figure 1:
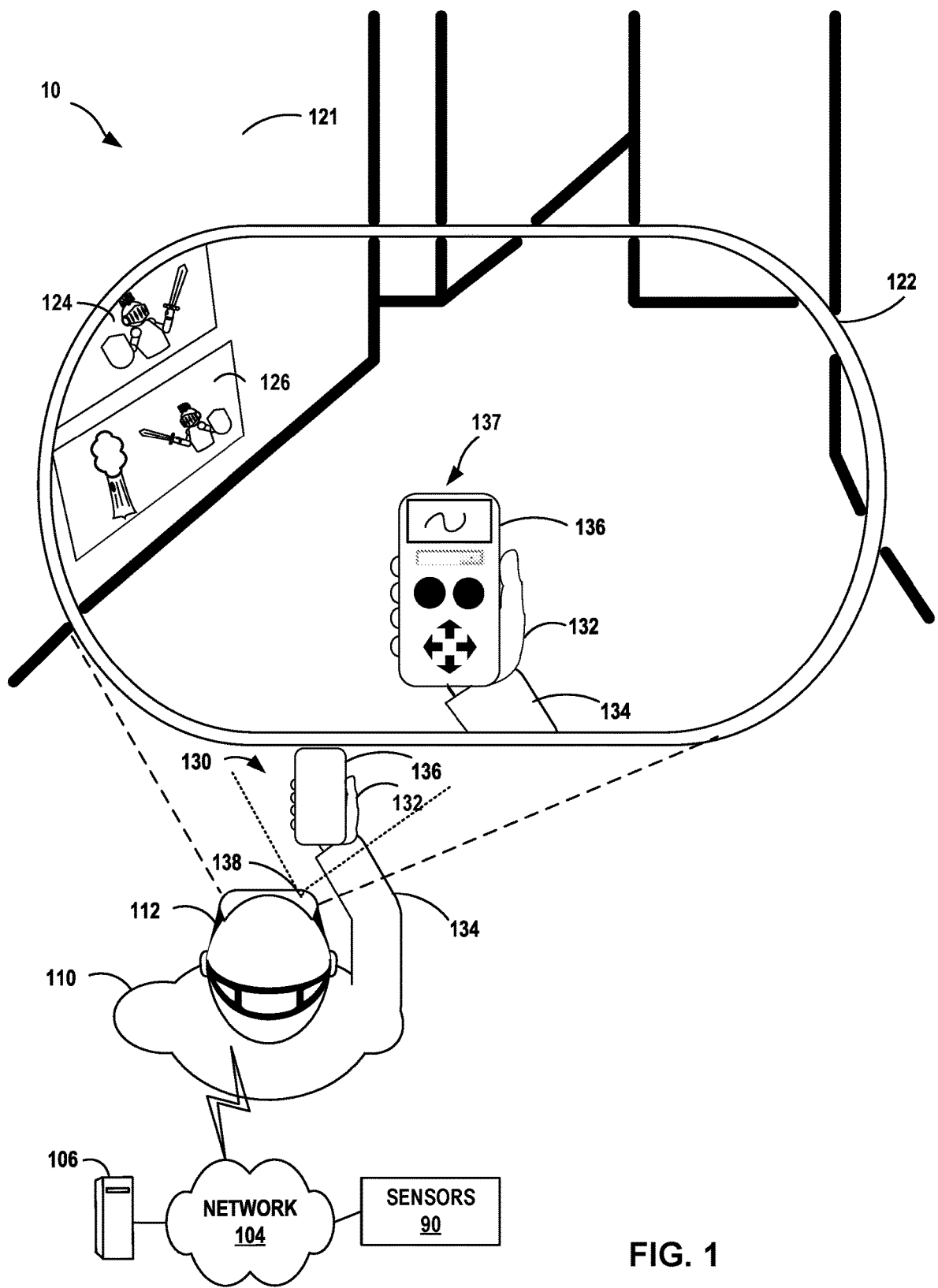
FIG. 1 is a block diagram depicting an example multi-device artificial reality system that authenticates instructions for execution by a processor of the artificial reality system, in accordance with the techniques described in this disclosure.

FIG. 1 is a block diagram depicting an example multi-device artificial reality system that authenticates instructions for execution by a processor of the artificial reality system, in accordance with the techniques described in this disclosure. In the example of FIG. 1, artificial reality system 10 includes HMD 112, peripheral device 136, and may in some examples include one or more external sensors 90 and/or console 106.

As shown in FIG. 1, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1, virtual content items 124, 126 are mapped to positions on wall 121. The example in FIG. 1 also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1 shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application might not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., one or more SoCs) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface gesture and performs an action that is rendered to HMD 112.

In accordance with the techniques of this disclosure, an SoC of artificial reality system 10 may authenticate processor instructions stored by a ROM of the SoC prior to execution of the instructions by a processor. In one example, a ROM of an SoC of, e.g., HMD 112, stores a block of register words. The block of register words includes a first register word specifying an authentication tag and one or more register words that each specify an instruction. A security controller identifies the first register word as specifying the authentication tag and performs authentication of the authentication tag. Typically, the authentication tag is a cryptographic key value that has a bitlength equal to a length of a microprocessor instruction. In some examples, the authentication tag is a digital signature created with a private cryptographic key that the SoC may cryptographically authenticate with a corresponding public cryptographic key.

In an alternative implementation, to minimize overhead latency, the processor can execute the ROM instructions concurrently with verification of the authentication tag. Instead of using a public-private cryptographic key strategy, the security controller may use an AES key wherein the authentication tag is generated in 1 clock cycle, and instruction execution is paused if the authentication tag mismatches.

Upon successfully authenticating the authentication tag, the security controller forwards the register words that each specify instructions to a processor for execution. As described herein, successful authentication of the authentication tag means to mathematically or cryptographically prove that the authentication tag was generated by someone with access to a corresponding private cryptographic key, and therefore the security controller may determine, based on this proof, that the authentication tag and block of register words originated from an authorized person or entity and that an attacker has not modified or tampered with the authentication tag or block of register words.

Upon unsuccessfully authenticating the authentication tag, the security controller blocks the register words that each specify instructions from execution by the processor. As described herein, unsuccessful authentication of the authentication tag means to be unable to mathematically or cryptographically prove that the authentication tag was generated by someone with access to a corresponding private cryptographic key. Therefore, based on this lack of proof, the security controller may determine that the authentication tag and block of register words did not originate from an authorized person or entity or that that an attacker has modified or tampered with the authentication tag or block of register words. The techniques disclosed herein may enable an SoC of an HMD to authenticate instructions prior to execution of such instructions by a processor for the SoC. Furthermore, the techniques of the disclosure may enable cryptographic authentication of instructions without imposing a large latency on the execution of instructions by the processor.

Figure 2A:
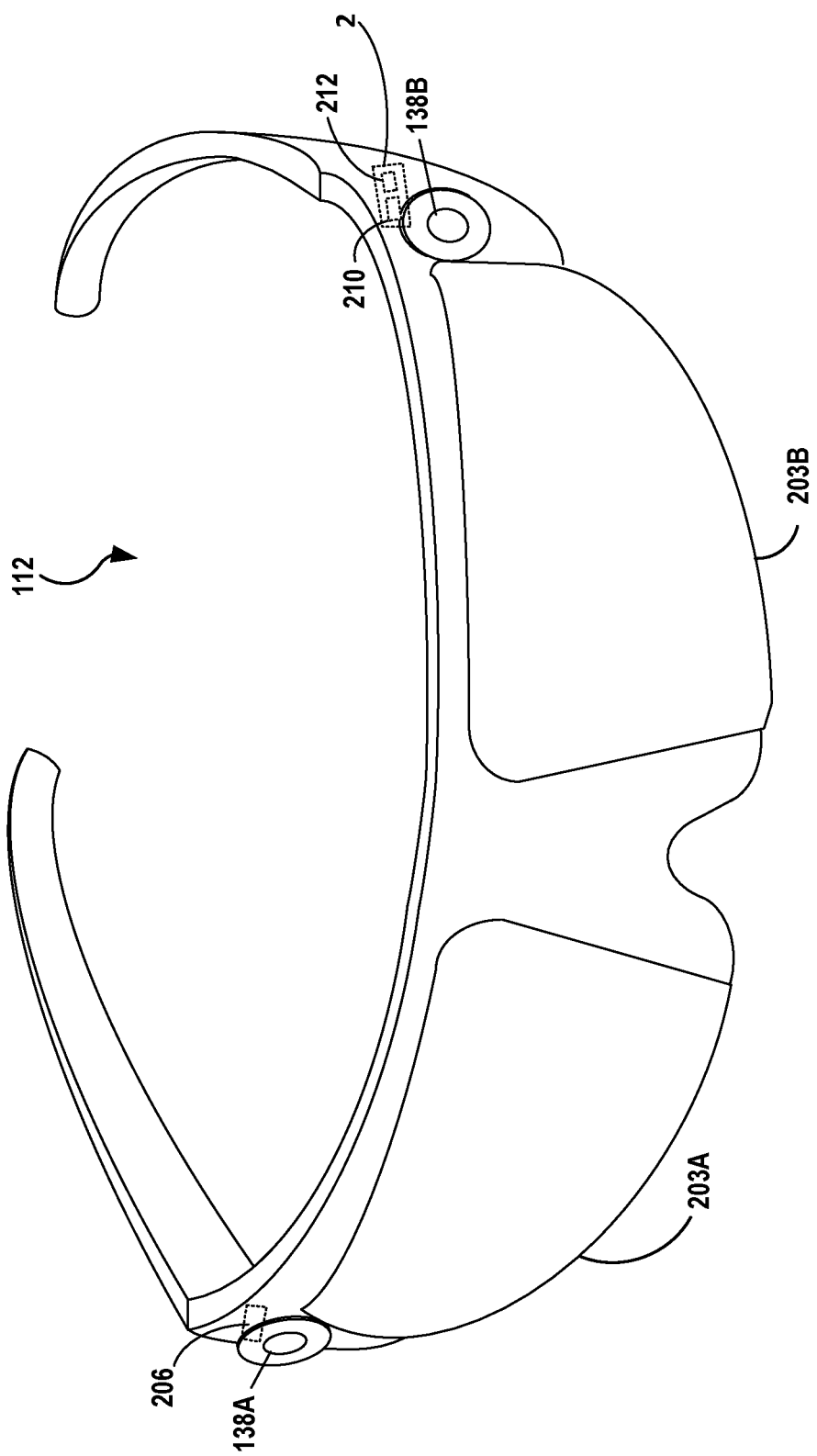
FIG. 2A is an illustration depicting an example HMD that authenticates instructions for execution by a processor of the artificial reality system, in accordance with techniques described in this disclosure.

FIG. 2A is an illustration depicting an example HMD 112 configured to authenticate instructions for execution by a processor of artificial reality system 10, in accordance with techniques described in this disclosure. HMD 112 of FIG. 2A may be an example of HMD 112 of FIG. 1. HMD 112 may be part of an artificial reality system, such as artificial reality system 10 of FIG. 1, or may operate as a stand-alone, mobile artificial realty system configured to implement the techniques described herein. In the example of FIG. 2A, HMD 112 takes the general form factor of glasses.

In this example, HMD 112 includes a front rigid body and two stems to secure HMD 112 to a user, e.g., by resting over the wearer's ears. In the example of FIG. 2A, electronic display 203 may be split into multiple segments, such as into two segments, with each segment corresponding to a separate lens disposed on the rigid front body of HMD 112. In other examples in accordance with FIG. 2A, electronic displays 203A-203B (collectively, "electronic displays 203") and may form a contiguous surface that spans both lenses and the lens-connecting bridge (i.e., the over-the-nose portion) of the rigid front body of HMD 112. In some examples in accordance with the form factor illustrated in FIG. 2A, electronic display 203 may also encompass portions of HMD 112 that connect the lenses of the front rigid body to the stems, or optionally, portions of the stems themselves. These various designs of electronic display 203 in the context of the form factor of HMD 112 shown in FIG. 2A improve accessibility for users having different visual capabilities (e.g. with respect to peripheral vision and/or central vision, nearfield vision and/or distance vision, etc.), eye movement idiosyncrasies, etc.

Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

In the example illustrated in FIG. 2A, HMD 112 further includes one or more motion sensors 36, such as one or more accelerometers (also referred to as inertial measurement units or "IMUs") that output data indicative of current acceleration of HMD 112, GPS sensors that output data indicative of a location of HMD 112, radar, or sonar that output data indicative of distances of HMD 112 from various objects, or other sensors that provide indications of a location or orientation of HMD 112 or other objects within a physical environment.

In the example illustrated in FIG. 2A, HMD 112 includes integrated image capture devices 138A and 138B (collectively, "image capture devices 138"). Image capture devices 138 may include still image camera hardware, video camera hardware, laser scanners, Doppler® radar scanners, fundus photography hardware, infrared imaging cameras, depth scanners, or the like. Image capture devices 138 may include outward-facing and/or inward-facing image capture hardware, and include any hardware configured to capture image data representative of a surrounding physical environment, and optionally, to preprocess and/or post process the captured image data. Outward-facing camera hardware of image capture devices 138 may capture image data of the physical environment outside of HMD 112, such as, but not limited to, the real-world environment at which user 8 is positioned. Inward-facing camera hardware of image capture devices 138 may capture image data of the wearer of HMD 112, such as facial images and/or retina scans. Other inward-facing sensor hardware of HMD 112 may capture other types of information pertaining to the wearer, such as temperature information or other types of information or metrics.

In the example illustrated in FIG. 2A, HMD 112 includes HMD SoC 2. SOC 2 of HMD 112 includes security controller 212, as described above with respect to FIG. 1. SOC 2 further includes internal control unit 210, which may include an internal power source and one or more printed-circuit boards having one or more processors, memory, and hardware to provide an operating environment for executing programmable operations to process sensed data and present artificial reality content on display 203.

In one example, control unit 210 is configured to, based on the sensed data (e.g., image data captured by image capture devices 138, position information from GPS sensors), generate and render for display on display 203 a virtual surface comprising one or more virtual content items (e.g., virtual content items 124, 126 of FIG. 1) associated with a position contained within field of view of image capture devices 138. As explained with reference to FIG. 1, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view. In some examples, a virtual surface is associated with a position on a planar or other surface (e.g., a wall), and control unit 210 will generate and render the portions of any virtual content items contained within that virtual surface when those portions are within the field of view.

In one example, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In accordance with the techniques of this disclosure, SoC 2 of HMD 112 includes a security controller 212. Security controller 212 may authenticate processor instructions stored by a ROM of SoC 2 prior to execution of the instructions by a processor of SoC 2. In one example, a ROM of SoC 2 stores a block of register words. The block of register words includes a first register word specifying an authentication tag and one or more register words that each specify an instruction. Security controller 212 identifies the first register word as specifying the authentication tag and performs authentication of the authentication tag. Upon successfully authenticating the authentication tag, security controller 212 forwards the register words that each specify instructions to a processor of SoC 2 for execution. Upon unsuccessfully authenticating the authentication tag, security controller 212 blocks the register words that each specify instructions from execution by the processor.

Figure 2B:
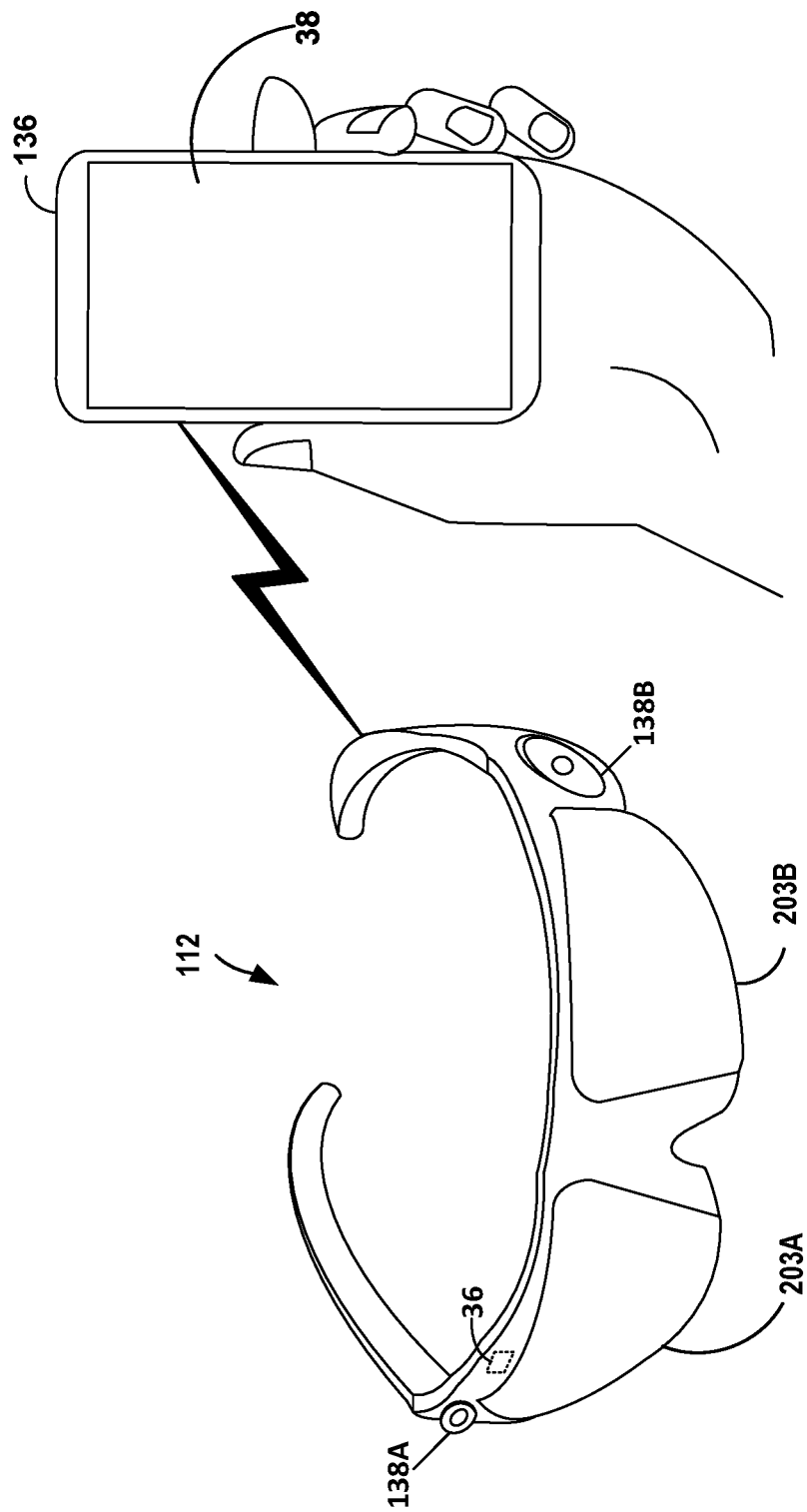
FIG. 2B is a block diagram depicting another example HMD and an example peripheral device that authenticates instructions for execution by a processor of the artificial reality system, in accordance with techniques described in this disclosure.

FIG. 2B is a block diagram depicting example HMD 112 and an example peripheral device 136 that authenticates instructions for execution by a processor of the artificial reality system, in accordance with techniques described in this disclosure. HMD 112 of FIG. 2B may be an example of HMD 112 of FIG. 1, and takes the form factor of glasses, as in the case of HMD 112 of FIG. 2A. In the example of FIG. 2B, image capture devices 138 may capture image data representative of various objects, including peripheral device 136 and/or of the hand(s) of user 8 in the physical environment that are within the FoV of image capture devices 138, which may generally correspond to the viewing perspective of HMD 112.

Surface 38 of peripheral device 136 represents an input component or a combined input/output component of peripheral device 136. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 136 to receive touch input or gesture input without direct contact with surface 38. User 8 may provide these touch or gesture inputs to peripheral device 136 to provide instructions directly to peripheral device 136, or indirectly to HMD 112 and/or other components of an artificial reality system in which HMD 112 is deployed. In some examples, a processor of HMD 112 may utilize image capture devices 138 to analyze configurations, positions, movements, and/or orientations of peripheral device 136, of the hand(s) or digit(s) thereof of user 8 to enable to provide input using gestures such as drawing gestures or typing gestures provided via a graphical keyboard.

Peripheral device 136 can communicate data to HMD 112 (and/or console 16) using wireless communications links (e.g., Wi-Fi™, near-field communication of short-range wireless communication such as Bluetooth®, etc.), or using wired communication links, or combinations thereof, or using other types of communication links. In the example of FIG. 2B, peripheral device 136 is also communicatively coupled to network 18, thereby enabling peripheral device 136 to communicate data to remote devices over network 18.

In this way, peripheral device 136 may offload various hardware and resource burdens from HMD 112, which enables low-profile form factor designs of HMD 112. Peripheral device 136 also serves as a communications intermediary between HMD 112 and devices at remote locations, via network 18. Further details of peripheral device 136 are described in U.S. patent application Ser. No. 16/506,618 (filed on 9 Jul. 2019), the entire content of which is incorporated herein by reference.

Figure 3:
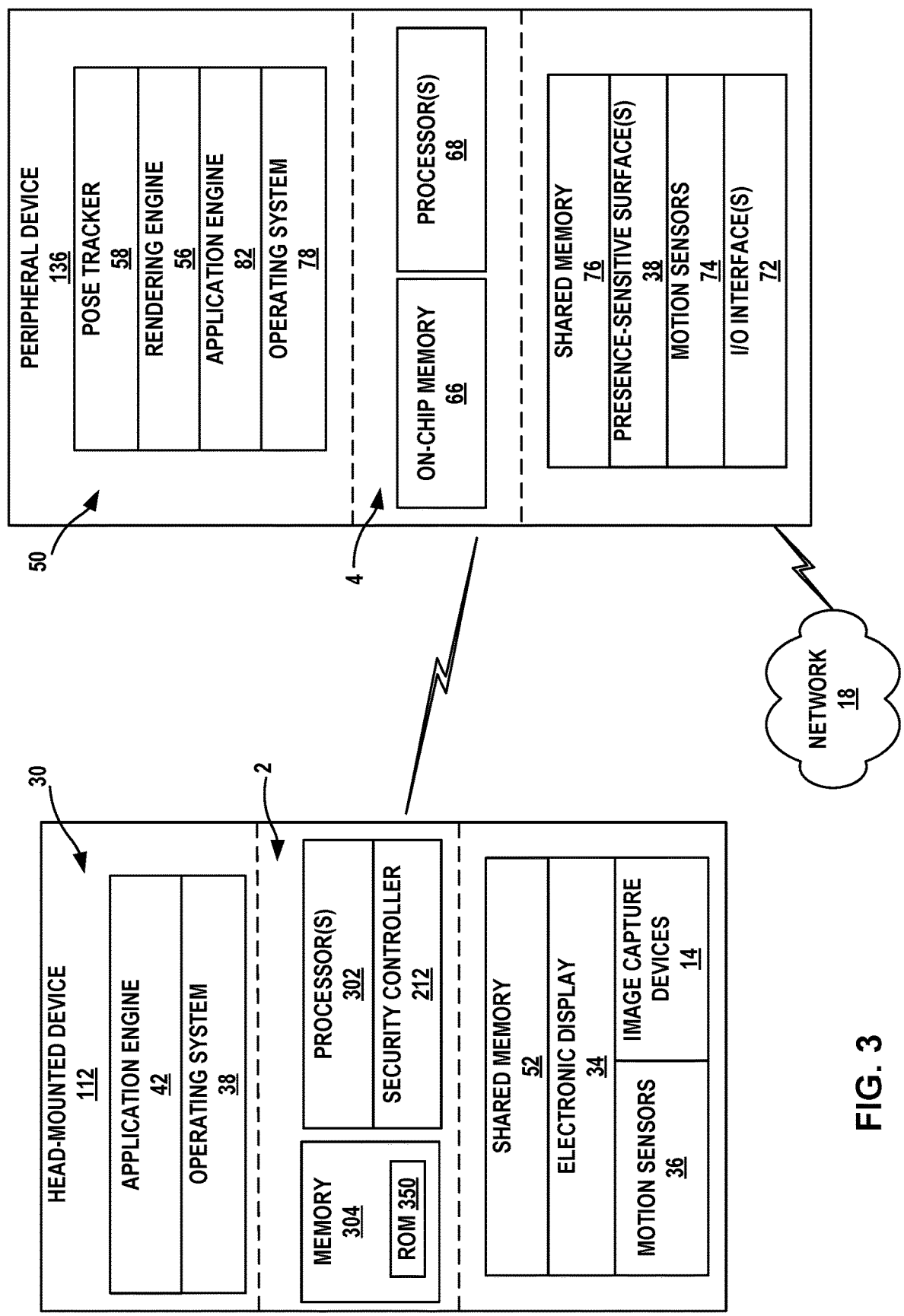
FIG. 3 is a block diagram showing example implementations of a console, an HMD, and a peripheral device of the multi-device artificial reality system of FIG. 1 in accordance with techniques described in this disclosure.

FIG. 3 is a block diagram showing example implementations of HMD 112 and peripheral device 136 of multi-device artificial reality system 10, 20 of FIG. 1, in accordance with techniques described in this disclosure. In this example, HMD SoC 2 of HMD 112 includes one or more processors 302 and memory 52.

Shared memory 52 and processor(s) 302 of HMD 112 may, in some examples, provide a computer platform for executing an operating system 38. Operating system 38 may represent an embedded, real-time multitasking operating system, for instance, or other type of operating system. In turn, operating system 38 provides a multitasking operating environment for executing one or more software components 30, including application engine 42.

Processor(s) 302 may be coupled to one or more of electronic display 203, motion sensors 36, and/or image capture devices 14. Processor(s) 302 are included in HMD SoC 2, which also includes on-chip memory 304. On-chip memory 302 is collocated with processor(s) 302 within a single integrated circuit denoted as HMD SoC 2 in the particular example shown in FIG. 3. Processor(s) 302 may use on-chip memory 302 as a temporary storage location for self-contained data processing performed within HMD SoC 2. Processor(s) 302 and on-chip memory 302 may combine to implement scheduler 3, although scheduler 3 is illustrated as a standalone component of HMD SoC 2 purely for the purposes of ease of illustration and discussion.

HMD 112 is communicatively coupled to peripheral device 136, as shown in FIG. 3. In some examples, peripheral device 136 and HMD 112 function in tandem as co-processing devices to deliver the artificial reality experiences to user 8 as described above with respect to FIGS. 1, 2A, and 2B. Peripheral device 136 may offload portions of the computing tasks otherwise performed by HMD 112, thereby enabling a reduced hardware infrastructure and therefore a lower-profile form factor with respect to the design of HMD 112.

Peripheral device 136 includes presence-sensitive surface 38 (described above with respect to FIG. 2), as well as input/output (I/O) interface(s) 72, and motion sensors 74. Peripheral device 136 may invoke I/O interface(s) 72 to send and receive data over network 18, such as cipher text or plain text (unencrypted) data. I/O interface(s) 72 may also incorporate hardware that enables peripheral device 136 to communicate wirelessly with HMD 112. Peripheral device 136 may invoke motion sensors 74 to detect and track motion by user 8 for use in computing updated pose information for a corresponding frame of reference of HMD 112.

Peripheral SoC 4 of peripheral device 136 includes on-chip memory 66 and one or more processors 68. On-chip memory 66 represents memory collocated with processor(s) 68 within a single integrated circuit denoted as peripheral SoC 4 in the particular example shown in FIG. 3. Processor(s) 68 may use on-chip memory 66 as a temporary storage location for self-contained data processing performed within peripheral SoC 4. Processor(s) 68 and on-chip memory 66 may combine to implement scheduler 5, although scheduler 5 is illustrated as a standalone component of peripheral SoC 4 purely for the purposes of ease of illustration and discussion.

Shared memory 76 and processor(s) 68 of peripheral device 136 provide a computer platform for executing an operating system 78. Operating system 78 may represent an embedded, real-time multitasking operating system, for instance, or other type of operating system. In turn, operating system 78 provides a multitasking operating environment for executing one or more software components 50.

Apart from operating system 78, software components 50 include an application engine 82, a rendering engine 56, and a pose tracker 58. In some examples, software components 50 may not include rendering engine 56, and HMD 112 may perform the rendering functionalities without co-processing with peripheral device 136. In general, application engine 82, when invoked, provides functionality to provide and present an artificial reality application, e.g., a teleconference application, a gaming application, a navigation application, an educational application, a training application, a simulation application, or the like, to user 8 via HMD 112. Application engine 82 may include, for example, one or more software packages, software libraries, hardware drivers, and/or Application Program Interfaces (APIs) for implementing an artificial reality application. Responsive to control by application engine 82, rendering engine 56 generates artificial reality content 22 (e.g., incorporating 3D artificial reality content) for display to user 8 by application engine 42 of HMD 112.

Application engine 82 and rendering engine 56 construct artificial reality content 22 for display to user 8 in accordance with current pose information for a frame of reference, typically a viewing perspective of HMD 112, as determined by pose tracker 58. Based on the current viewing perspective as determined by pose tracker 58, rendering engine 56 constructs artificial reality content 22 (e.g., 3D artificial content) which may in some cases be overlaid, at least in part, upon the real-world 3D environment of user 8.

During this process, pose tracker 58 operates on sensed data received from HMD 112, such as movement information and user commands, and, in some examples, data from any external sensors 26 (shown in FIG. 1), to capture 3D information within the real-world environment, such as motion by user 8 and/or feature tracking information with respect to user 8. Based on the sensed data, pose tracker 58 determines a current pose for the frame of reference of HMD 112 and, in accordance with the current pose, constructs artificial reality content 22 for communication, via one or more I/O interfaces 72, to HMD 112 for display to user 8.

While HMD 112 and peripheral device 136 may communicate on a number of levels, FIG. 3 is primarily described with respect to communications at the level represented by HMD SoC 2 and peripheral SoC 4. Shared memory 52 includes the SMEM of HMD SoC 2, and shared memory 76 includes the SMEM of peripheral SoC 4. Similarly, processor(s) 302 include a security processor of HMD SoC 2, and processor(s) 68 include a security processor of peripheral SoC 4.

Each of processors 302 and 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of shared memory 52, shared memory 76, on-chip memory 302, or on-chip memory 66 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), or flash memory.

In some examples, memory 304 comprises ROM 350, which is a read-only memory. In some examples, ROM 350 stores instructions for executing operating system 305. In some examples, ROM 350 stores instructions for performing a boot-strapping operation at power-on of HMD 112 (or SoC 2) to initialize and execute operating system 305. ROM 350 typically stores a collection of various sub-routines, many of which have a pre-defined deterministic control flow. Other sub-routines stored by ROM 350 may be determined at run-time, such as one-time programming (OTP) write, servicing alarms or interrupts, execution of patches, etc.

It may be desirable for ROM 350 to be secured from attack so as to prevent execution of unauthorized instructions. ROM 350 may be secured from attack by using a hashing or cryptographic algorithm to encrypt instructions stored by ROM 350. However, the use of hashing or cryptographic algorithms may impose significant area overhead on SoC 2 (e.g., by requiring silicon space for an additional 40,000 to 100,000 logic gates that implement cryptographic functions). Further, the use of hashing or cryptographic algorithms may impose noticeable latency in execution of instructions stored by the ROM (e.g., adding a 10 to 64-cycle delay in execution).

In accordance with the techniques described herein, HMD 112 includes security controller 212 that authenticates instructions for execution by processor 302 that are stored by ROM 350 prior to execution of the instructions by processor 350. In one example, ROM 350 stores a block of register words. The block of register words includes a first register word specifying an authentication tag and one or more register words that each specify an instruction. Security controller 210 identifies the first register word as specifying the authentication tag and performs authentication of the authentication tag. Upon successfully authenticating the authentication tag, security controller 210 forwards the register words that each specify instructions to processor 302 for execution. Upon unsuccessfully authenticating the authentication tag, security controller 210 blocks the register words that each specify instructions from execution by processor 302.

The techniques disclosed herein may enable security controller 212 to authenticate instructions stored by ROM 350 prior to execution of such instructions by processor 302. Furthermore, the techniques of the disclosure may enable cryptographic authentication of instructions stored by ROM 350 without imposing a large latency on the execution of instructions by processor 302. Additionally, the techniques of the disclosure may enable SoC 2 to use dynamically-defined authentication tags stored by ROM 350 to authenticate instructions for execution, thereby enabling SoC 2 to maintain the ability to authenticate the instructions even after reprogramming ROM 350, such as after software updates to the instructions stored by ROM 350. Furthermore, the techniques of the disclosure may enable SoC 2 to implement a flexible authentication scheme of instructions, thereby allowing SoC 2 to perform authentication of individual subroutines stored by ROM 350, chain authentication of multiple authentication tags stored by ROM 350, and bypass authentication of subroutines stored by ROM 350.

Figure 4:
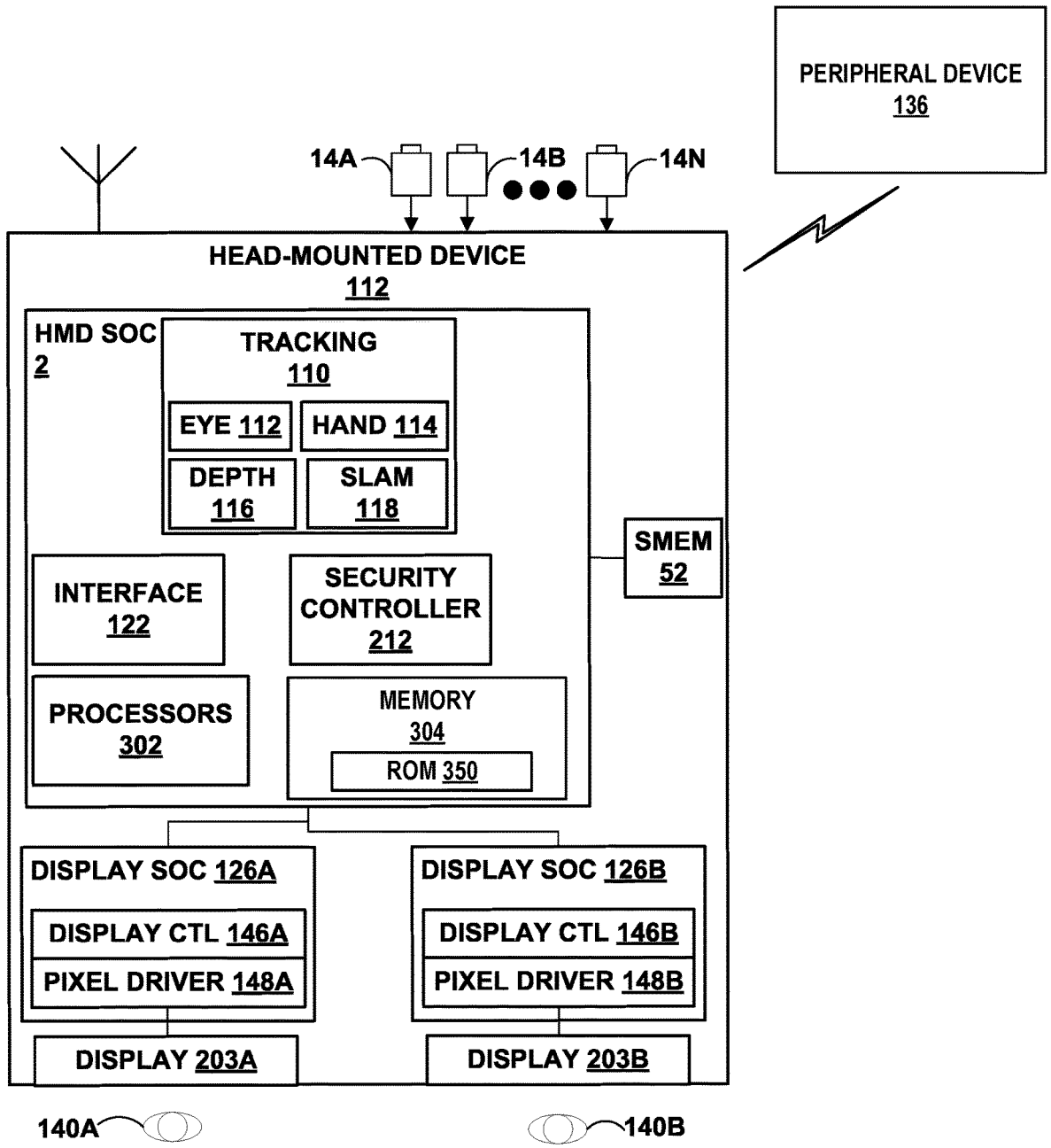
FIG. 4 is a block diagram illustrating a more detailed example implementation of a distributed architecture for a multi-device artificial reality system in which an HMD is implemented using one or more SoC integrated circuits in accordance with techniques described in this disclosure.

FIG. 4 is a block diagram illustrating a more detailed example implementation of a distributed architecture for a multi-device artificial reality system in which HMD 112 is implemented using one or more SoC integrated circuits in accordance with techniques described in this disclosure.

As depicted in the example of FIG. 4, HMD 112 operates in conjunction with peripheral device 136. Again, peripheral device 136 represents a physical, real-world device having a surface on which multi-device artificial reality systems 10 or 20 overlay virtual content. In some examples, peripheral device 136 may have a form factor similar to any of a smartphone, a tablet computer, a personal digital assistant (PDA), or other hand-held device. In other examples, peripheral device 136 may have the form factor of a smartwatch, a so-called "smart ring," or other wearable device. Peripheral device 136 may also be part of a kiosk or other stationary or mobile system. Components of peripheral device 136 in FIG. 4 may operate similarly to components of peripheral device 136 in FIG. 3.

HMD SoC 2 represents a specialized integrated circuit, where SoC 2 includes various specialized functional blocks configured to provide an operating environment for artificial reality applications. FIG. 4 is merely one example arrangement of SoC integrated circuits of HMD 112. In other examples, the functionality of SoC integrated circuit 2 may be distributed across HMD 112 and peripheral device 136. The architecture for multi-device artificial reality systems 10 and 20 may include any collection, distribution, and/or arrangement of SoC integrated circuits across HMD 112 and peripheral device 136.

In the example of FIG. 4, HMD SoC 2 of HMD 112 comprises functional blocks including tracking 110, security processor 120, interface 122, and processors. Tracking 110 provides a functional block for eye tracking 112 ("eye 112"), hand tracking 114 ("hand 114"), depth tracking 116 ("depth 116"), and Simultaneous Localization and Mapping (SLAM) 118 ("SLAM 118").

For example, HMD 112 may receive input from one or more accelerometers (e.g., quantities represented in inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 136 and/or hand and/or the eyes of user 8) in the physical environment that are within a field of view of image capture devices, which typically corresponds with the viewing perspective of HMD 112 or the inward-facing view of HMD 112. Based on a portion of the sensed data and/or a portion of the image data, tracking 110 determines, for example, a current pose for the frame of reference of HMD 112 and, in accordance with the current pose, renders the artificial reality content.

Application processors 302 include various processors such as a video processing unit, graphics processing unit (GPU), digital signal processors (DSPs), encoders and/or decoders, and/or others. In accordance with the techniques described in this disclosure, all or portion(s) of a backend shell may be implemented in hardware, software, or a combination of hardware and software. For example, the backend shell of a concurrent application engine may be executed on application processors 302. A plurality of artificial reality applications may be concurrently executed on application processors 302, in some examples.

Display SoCs 126A and 126B (collectively, "display SoCs 126") each represent display controllers for outputting artificial reality content on respective displays, e.g., displays 203 of FIG. 2B. In this example, display SoC 126A includes display controller 146A and pixel driver 148A for display 203A to output artificial reality content for a left eye 140A of user 8. Similarly, display SoC 126B includes display controller 146B and pixel driver 148B for display 203B to output artificial reality content for a right eye 140B of user 8. Displays 203 may include any one or more of light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

HMD SoC 4 may connect with one or more communication devices (e.g., radio transmitter) using interface 88 for communicating with other devices, such as peripheral device 136.

In some examples, memory 304 comprises ROM 350, which is a read-only memory. In some examples, ROM 350 stores instructions for executing operating system 305. In some examples, ROM 350 stores instructions for performing a boot-strapping operation at power-on of HMD 112 (or SoC 2) to initialize and execute operating system 305. ROM 350 typically stores a collection of various sub-routines, many of which have a pre-defined deterministic control flow. Other sub-routines stored by ROM 350 may be determined at run-time, such as one-time programming (OTP) write, servicing alarms or interrupts, execution of patches, etc.

It may be desirable for ROM 350 to be secured from attack so as to prevent execution of unauthorized instructions. ROM 350 may be secured from attack by using a hashing or cryptographic algorithm to encrypt instructions stored by ROM 350. However, the use of hashing or cryptographic algorithms may impose significant area overhead on SoC 2 (e.g., by requiring silicon space for an additional 40,000 to 100,000 logic gates that implement cryptographic functions). Further, the use of hashing or cryptographic algorithms may impose noticeable latency in execution of instructions stored by the ROM (e.g., adding a 10- to 64-cycle delay in execution).

In accordance with the techniques described herein, HMD 112 includes security controller 212 that authenticates instructions for execution by processor 302 that are stored by ROM 350 prior to execution of the instructions by processor 350. In one example, ROM 350 stores a block of register words. The block of register words includes a first register word specifying an authentication tag and one or more register words that each specify an instruction. Security controller 210 identifies the first register word as specifying the authentication tag and performs authentication of the authentication tag.

In some examples, security controller 212 dynamically defines the authentication tags. For example, security controller 212 may implement a Galois Hash (GHASH) engine to generate, compare, and validate authentication tags. In this example, each register word stored by the ROM extends the length of an microprocessor instruction (e.g., the length of a "word" or a fixed unit of data used by processor 302) to specify an additional 2 flag bits. For example, the register word may store an 8-bit word appended with a 2-bit flag, wherein security controller 212 may interpret the 8-bit word as either a processor instruction or an authentication tag as specified by the flag of the register word. For example, security controller 212 processes each register word to determine, based on the 2 flag bits, whether the register word is an instruction to be executed by the microprocessor or an authentication tag for use in authenticating the block. For example, a "00" indicates that the authentication tag is to be bypassed for this register word, a "01" indicates that the register word is the beginning of a new tag block, a "10" indicates that the register word is a continuation of the previous tag block, and a "11" indicates that this register word specifies the authentication tag.

In some examples, ROM 350 stores authentication tags at statically defined addresses. In this example, the GHASH engine of security controller 212 defines a pre-defined number of authentication tags and instruction-pointer checkpoints, which may be hard-coded into a plurality of transistors arranged in a "sea-of-gates" configuration at the register transfer level (RTL) of ROM 350. For example, the GHASH engine may program the plurality of transistors with the first register word specifying the authentication tag and the one or more register words that each specify an instruction such that the authentication tag is located at a pre-defined address of ROM 350. In this example, each register word stored by the ROM is the length of an microprocessor instruction (e.g., the length of a "word" or a fixed unit of data used by processor 302).

In response to identifying a register word as specifying an authentication tag, the GHASH engine of security controller 212 performs authentication of the identified authentication tag. In response to successfully authenticating the authentication tag, security controller 210 forwards the register words that each specify instructions to processor 302 for execution. In response to unsuccessfully authenticating the authentication tag, security controller 210 blocks the register words that each specify instructions from execution by processor 302.

Figure 5:
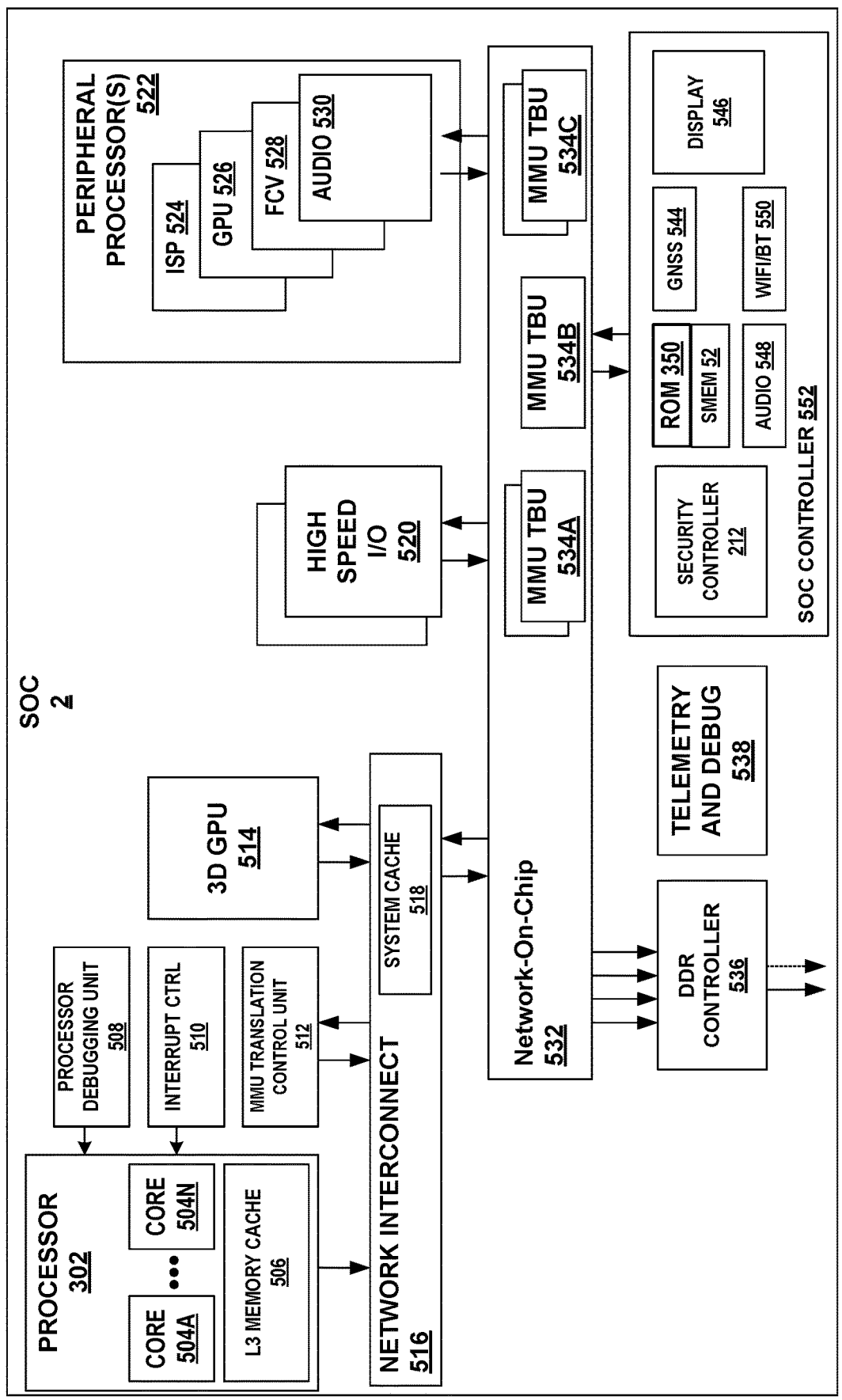
FIG. 5 is a block diagram illustrating an example SoC that may be integrated within the HMD of FIG. 1 in accordance with the techniques of the disclosure.

FIG. 5 is a block diagram illustrating example SoC 2 that may be integrated within HMD 112 of FIG. 1 in accordance with the techniques of the disclosure. SoC 2 includes processor 302, 3D GPU 514, high-speed I/O 520, peripheral processors 522, Network-on-Chip (NoC) integrated circuit 532, DDR controller 536, and controller 552.

Processor 302 is one or more microprocessors, digital signal processors (DSPs), application specific integrated circuits (ASICs), field programmable gate arrays (FPGAs), or any other equivalent integrated or discrete logic circuitry, as well as any combinations of such components. Processor 302 comprises a plurality of processing cores 504A-504N (collectively, "cores 504"). Processor 302 further comprises L3 memory cache 506. L3 memory cache 506 comprises a common memory cache shared by cores 504. Processor debugging unit 508 provides debugging capabilities for processor 302. Interrupt controller 510 services interrupts generated by processor 302 and/or SoC 2.

3D graphic processing unit (GPU) 514 is a graphics process unit that may be configured to provide 3-dimensional (3D) graphics processing capabilities. In some examples, 3D GPU 514 comprises a plurality of cores or cells configured to provide parallel processing capabilities for rendering 3D images or video.

High-speed I/O 520 may provide high-speed input and output capabilities to SoC for communicating with components exterior to SoC 2, such as with other components of HMD 112 or peripheral device 136.

Peripheral processors 522 provide dedicated processors for different types of data serviced by SoC 2. Peripheral processors 522 may include integrated circuitry or hardware configured to process specific types of data. For example, peripheral processors 522 may include image signal processor (ISP) 524 for processing images, GPU 526, FCV 528, and audio processing unit 530.

Network interconnect 516 provides a high-speed interconnection medium between various components of SoC 2, particularly to data transferred between processor 302, 3D GPU 514, memory management unit (MMU) translation control unit (TCU) 512, and MMU translation buffer units (TBUs) 534A-534C of NoC integrated circuit 532, high-speed I/O 520, peripheral processors 522, and DDR controller 536. Network interconnect 516 may include a system cache 518 for storing and/or buffering data transferred between various components of SoC 2.

SoC 2 further includes telemetry and debug unit 538. Telemetry and debug unit 538 may record and transmit telemetry for SoC 2 to an external device, such as HMD 112 or peripheral device 136. Further, telemetry and debug unit 538 may provide debugging functionalities for SoC 2.

SoC controller 552 provides various controllers for driving various functionality of SoC 2. For example, SoC controller 552 includes security controller 212, ROM 350, shared memory 52, audio controller 548, GNSS 544, WIFI and BlueTooth® controller 550, and display controller 546.

In accordance with the techniques described herein, security controller 212 of SoC 2 authenticates instructions for execution by processor 302 that are stored by ROM 350 prior to execution of the instructions by processor 350. In one example, ROM 350 stores a block of register words. The block of register words includes a first register word specifying an authentication tag and one or more register words that each specify an instruction. Security controller 210 identifies the first register word as specifying the authentication tag and performs authentication of the authentication tag.

In some examples, security controller 212 dynamically defines the authentication tags. For example, security controller 212 may implement a Galois Hash (GHASH) engine to generate, compare, and validate authentication tags. In this example, each register word stored by the ROM extends the length of an microprocessor instruction to specify 2 flag bits. For example, the register word may store an 8-bit word appended with a 2-bit flag, wherein security controller 212 may interpret the 8-bit word as either a processor instruction or an authentication tag as specified by the flag of the register word. For example, security controller 212 processes each register word to determine, based on the 2 flag bits, whether the register word is an instruction to be executed by the microprocessor or an authentication tag for use in authenticating the block. For example, a "00" indicates that the authentication tag is to be bypassed for this register word, a "01" indicates that the register word is the beginning of a new tag block, a "10" indicates that the register word is a continuation of the previous tag block, and a "11" indicates that this register word specifies the authentication tag.

In some examples, ROM 350 stores authentication tags at statically defined addresses. In this example, the GHASH engine of security controller 212 defines a pre-defined number of authentication tags and instruction-pointer checkpoints, which may be hard-coded into a plurality of transistors arranged in a "sea-of-gates" configuration at the register transfer level (RTL) of ROM 350. For example, the GHASH engine may program the plurality of transistors with the first register word specifying the authentication tag and the one or more register words that each specify an instruction such that the authentication tag is located at a pre-defined address of ROM 350.

In response to identifying a register word as specifying an authentication tag, the GHASH engine of security controller 212 performs authentication of the identified authentication tag. In response to successfully authenticating the authentication tag, security controller 210 forwards the register words that each specify instructions to processor 302 for execution. In response to unsuccessfully authenticating the authentication tag, security controller 210 blocks the register words that each specify instructions from execution by processor 302.

In some examples, security controller 212 uses a lightweight approach for authentication tags, such as GHASH. GHASH is an authentication tag generation pipeline that may operate in parallel with AES encryption in, e.g., Galois/Counter Mode (GCM) streaming mode. because the authentication tags are used for authentication (and not necessarily for encryption), security controller 212 leverages the GHASH front-end from GCM that computes Additional Authentication Data (AAD). This hardware may incur approximately 5,000 logic gates of overhead space on the silicon die of SoC 2, which may be substantially less than other encryption techniques. Further, security controller 212 may incorporate single-cycle latency that operates in parallel to ROM execution without adding any delay due to authentication. In some examples, a 128-bit private cryptographic key for GHASH is encoded in RTL.

In some examples, ROM 350 stores authentication tags statically in RTL in a sea-of-gates configuration. However, this may require finalization of code development for the routines stored in ROM 350 that are to be authenticated. In this static approach, a pre-defined number of golden authentication tags and instruction-pointer checkpoints are hard-coded into RTL of ROM 350. As the GHASH engine of security controller 212 reaches these checkpoints, the GHASH engine authenticates the stored authentication tag. This does not require any change to the ROM table of ROM 350, but may require the code of ROM 250 to be frozen prior to production.

As an alternative approach, ROM 350 may store the authentication tags in-line such that security controller 212 interprets authentication tags dynamically. This has few advantages. For example, a dynamic configuration scheme enables one to apply late-binding changes (e.g., updates or patches) to software of ROM 350 without losing the ability to authenticate the instructions stored by ROM 350. Furthermore, the dynamic configuration scheme described herein enables SoC 2 to implement flexible schemes, such as tagging individual sub-routines, chaining tags, bypassing sub-routines etc.

In some examples, where AAD authentication tags are stored dynamically in ROM 350, security controller 212 may distinguish register words of ROM 350 that specify processor instructions from register words of ROM 350 that specify authentication tags. Further, security controller 212 implements a flow to insert the authentication tags into the binary of ROM 350. In this example, each register word of ROM 350 is extended to include an additional 2 ACT bits to. Security controller 212 interprets these 2 bits as following:

Flag "00": This flag indicates the start of a bypass section. Security controller 212 does not update the running tag until the end of the sub-routine. In some examples, during DFT/debug mode, security controller 212 may be configured to override all ACT bits with '0' via TDR override so as to cause security controller 212 to bypass the ROM instruction authentication check.

Flag "01": This flag indicates that security controller 212 is to start a fresh tag accumulation. This may enable security controller 212 to authenticate a sub-routine that may be reached from multiple branches, and otherwise may be difficult to chain with previous instructions. Security controller 212 may authenticate these subroutines independently.

Flag "10": This flag indicates that security controller 212 should continue tag accumulation from prior instructions. This allows security controller 212 to implement chaining of authentication tags. For a deterministic flow, such as a pre-boot sequence, this flag enables security controller 212 to carry over a ROM execution check across multiple boot steps. Further, this may enable code of ROM 350 to implement an authentication check of loops that may run for an indeterministic amount of time (e.g., polling on a status register). Therefore, security controller 212 may break such loops in two, where security controller 212 performs authentication of the first loop and bypasses subsequent loops by leveraging the ACT bits.

Flag "11": This flag indicates that the register word specifies an authentication tag. In response to determining that a register word specifies this flag, security controller 212 checks the accumulating GHASH authentication tag with this golden tag, and raises an authentication failure interrupt if the comparison is a mismatch. In some examples, security controller 212 filters this instruction from execution by processor 302 by converting the register word into a no-operation (NOP) instruction, which is passed to processor 302.

In an alternative approach (e.g., to simplify insertion of authentication tags into ROM 350), security controller 212 may interpret a flag of "11" as pointing (e.g., jumping) ROM 350 to an authentication tag read routine. This routine may implement a counter that progressively walks through the authentication tags stored at a different "DATA only" sections of ROM 350 to authenticate each block of instructions associated with each authentication tag. As the register word specifying the authentication tag is passed to processor 302 as a NOP instruction, the GHASH engine of security controller 212 compares the specified authentication tag with an expected authentication tag to authenticate the authentication tag.

Figure 6A:
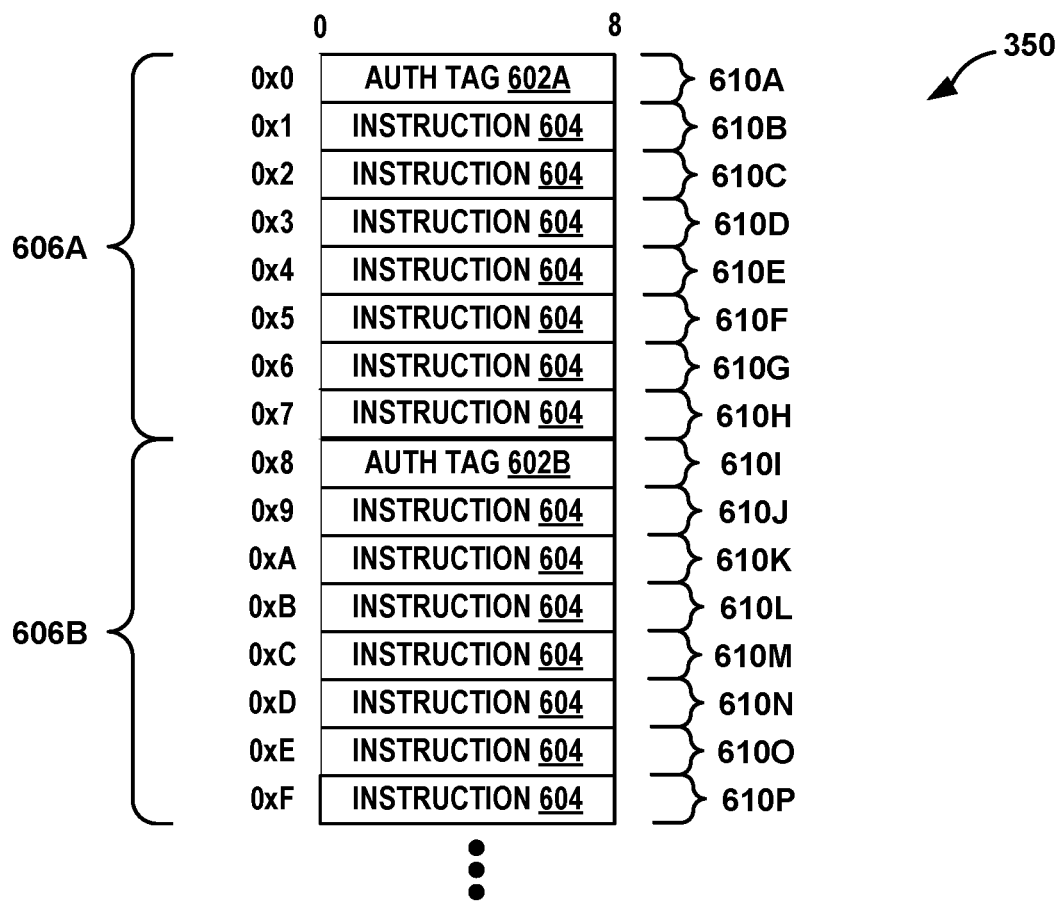
FIGS. 6A-6B are block diagrams of example blocks of register words stored by a ROM of an SoC in accordance with the techniques of the disclosure.
Figure 6B:
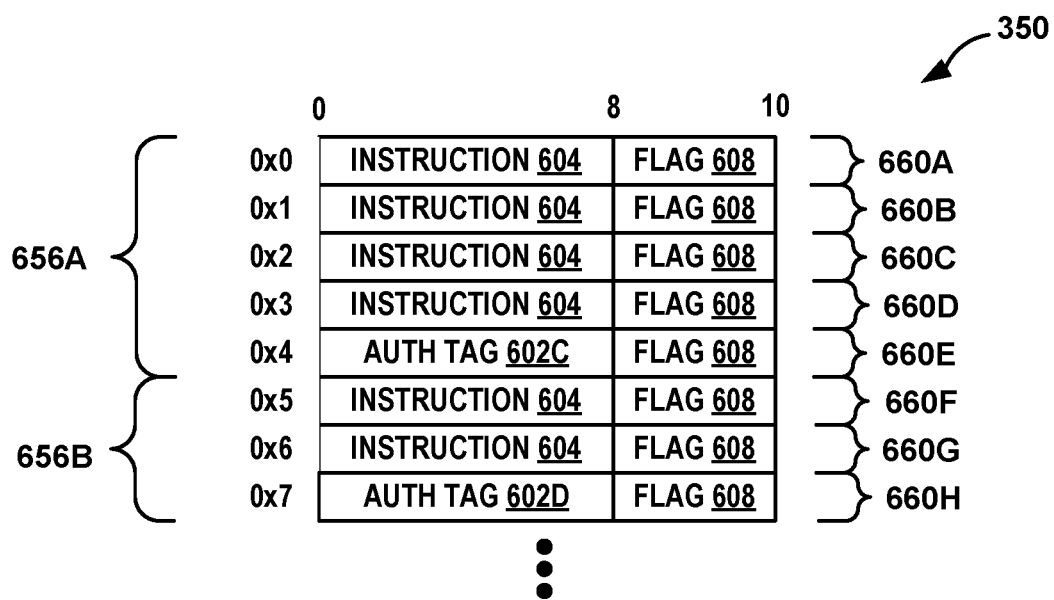

FIGS. 6A-6B are block diagrams of example blocks of register words stored by a ROM of an SoC in accordance with the techniques of the disclosure. FIGS. 6A-6B are described with respect to FIG. 3 for convenience. For example, ROM 350 of FIG. 3 may store blocks of register words 606, 656A, 656B.

FIG. 6A depicts an example wherein authentication tags 602A, 602B (collectively, "authentication tags 602") are stored at a pre-defined address of ROM 350. For example, as depicted in FIG. 6A, ROM 350 stores block 606A of register words 610A-610H and block 606B of register words 6101-610P. Blocks 606A-606B may be collectively referred to as "blocks 606," and register words 610A-610P may be collectively referred to as "register words 610." Each block 606 comprises a fixed length of register words 610. Further, each block 606 includes a first register word 610 specifying an authentication tag and one or more register words 610 that each specify an instruction 604 executable by processor 302 of FIG. 3. For example, register word 610A of block 606A specifies authentication tag 602A, and register words 610B-610H each specify an instruction 604. Further, register word 6101 of block 606B specifies authentication tag 602B, and register words 610J-610P each specify an instruction 604. Authentication tag 602A is stored at address 0x0 of ROM 350, and authentication tag 602B is stored at address 0x8 of ROM 350.

In the example of FIG. 6A, security controller 212 may identify an authentication tag 602 for a block 606 by retrieving a corresponding register word 610 from a pre-defined address for the authentication tag 602 for the block 606. For example, for block 606A, security controller 212 may retrieve register word 610A from address 0x0 to obtain authentication tag 602A. As another example, for block 606B, security controller 212 may retrieve register word 610B from address 0x8 to obtain authentication tag 602B. Security controller 212 may then perform authentication of authentication tag 602B as described above.

FIG. 6B depicts an example wherein authentication tags 602C, 602B (collectively, "authentication tags 602") are stored at a dynamic address of ROM 350. For example, as depicted in FIG. 6B, ROM 350 stores block 656A of register words 660A-660E and block 656B of register words 660F-610H. Blocks 656A-656B may be collectively referred to as "blocks 656," and register words 660A-660H may be collectively referred to as "register words 660." Each block 656 comprises a dynamic length of register words 660. Each block 656 includes one or more register words 660 that each specify an instruction 604 executable by processor 302 of FIG. 3 and a first register word 660 specifying an authentication tag 602. For example, register words 660A-660D each specify an instruction 604 and register word 660E of block 656A specifies authentication tag 602C. Further, register words 660F-660G each specify an instruction 604 and register word 660D of block 656B specifies authentication tag 602D. As further illustrated in FIG. 6B, blocks 656 are of different length in that block 656A includes five register words 660A-660E while block 656B includes three register words 660F-660H.

As depicted in the example of FIG. 6B, each register word 660 comprises one of an authentication tag 602 or an instruction 604. Further, each register word 660 includes a flag 608 indicative of whether the register word 660 specifies the authentication tag 602 or the instruction 604. Security controller 212 may identify an authentication tag 602 for a block 656 by determining whether a flag 608 of a corresponding register word 660 indicates that the register word 660 specifies an authentication tag 602 or an instruction 604. Security controller 212 may then perform authentication of authentication tag 602 as described above.

In some examples, each flag 608 is 2 bits. For example, a flag 608 of "00" indicates that security controller 212 is to bypass authentication tag 602 for the current register block 660. A flag 608 of "01" indicates that the register word 660 is the beginning of a new block 656. A flag 608 of "10" indicates that the register word 660 is a continuation of the previous block 656. A flag 608 of "11" indicates that the register word 660 specifies the authentication tag 602.

As depicted in the example of FIG. 6B, each block 656 includes the register words 660 that each specify an instruction 604 followed by the authentication tag 602 for the block 656. This may simplify the GHASH implementation logic because storage of the authentication tag 602 is not necessary while processing the instructions for the block 656. For example, the GHASH engine may update a running tag with each instruction, and subsequently compares the running tag with an authentication tag 602 when the flag bits (e.g., the ACT bits) of the register word 660 indicate "11" (e.g., indicating that the register word 660 specifies an authentication tag).

Figure 7:
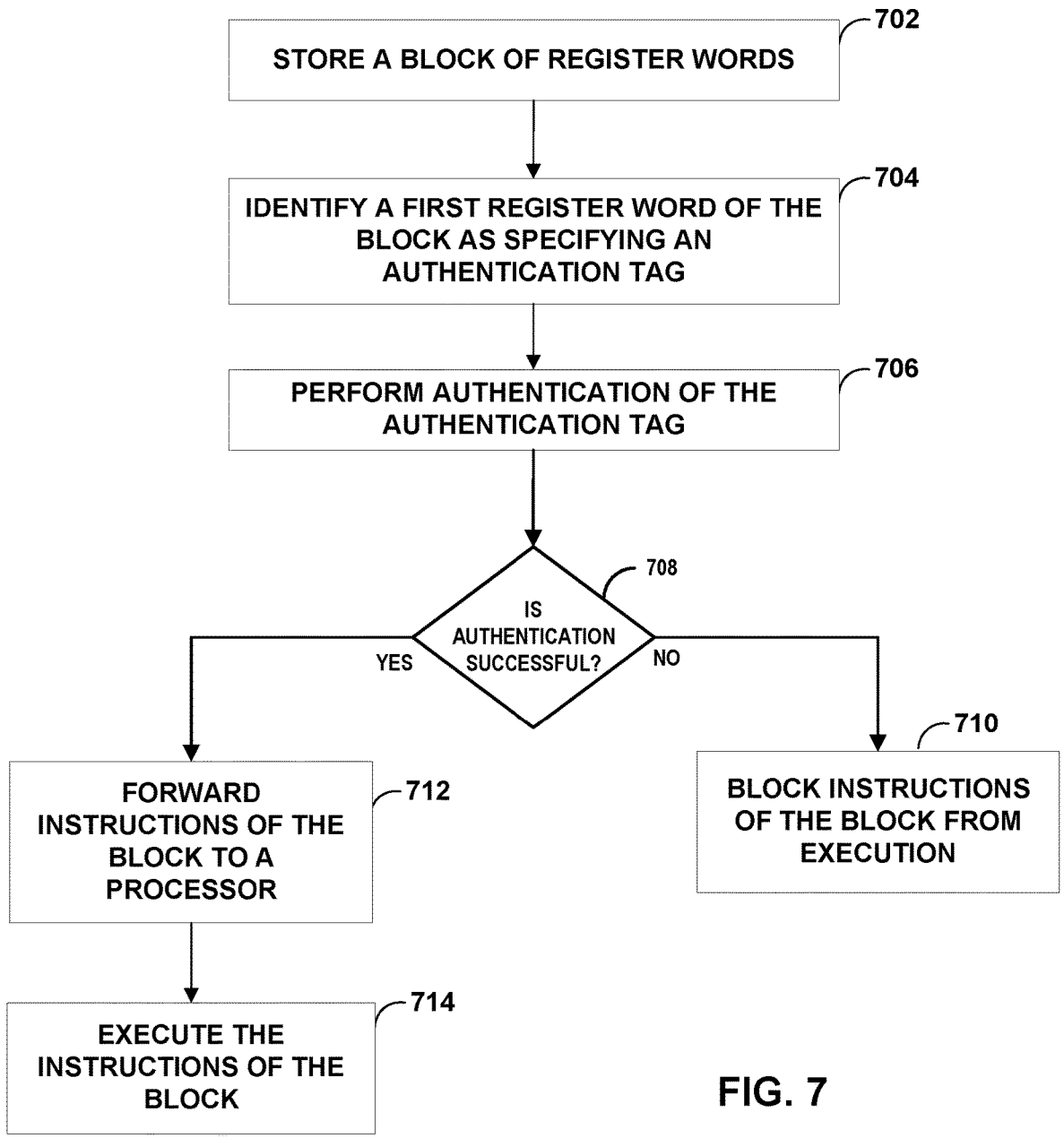
FIG. 7 is a flowchart illustrating an example operation in accordance with the techniques of the disclosure.

FIG. 7 is a flowchart illustrating an example operation in accordance with the techniques of the disclosure. FIG. 7 is described with respect to FIGS. 3 and 4 for convenience.

In the example of FIG. 7, ROM 350 stores a block of register words (702). The block of register words comprises a first register word specifying an authentication tag and one or more register words that each specify an instruction.

Security controller 212 identifies the first register word of the block of register words as specifying an authentication tag (704). In some examples, the block of register words comprises a fixed number of register words. A first register word of the block is stored at a predetermined address of ROM 350 and specifies the authentication tag. Security controller 212 identifies the register word that specifies the authentication tag by retrieving, from the predetermined address, the register word and processing that register word as the authentication tag as described below.

In some examples, the block of register words comprises a dynamic (e.g., variable) number of register words. Each register word of the block of register words specifies either an instruction for execution by processor 302 or an authentication tag for the block of register words. Each register word further includes a flag that indicates whether the register word specifies an instruction or the authentication tag. Security controller 212 retrieves a first register word of the block from ROM 350. Security controller 212 processes the flag of the first register word determine, based on the tag of the first register word, that the first register word specifies the authentication tag and processing that register word as the authentication tag as described below.

Security controller 212 performs cryptographic authentication of the authentication tag to verify at least one of an integrity or a source of the block of register words (706). For example, security controller 212 may perform cryptographic authentication of the authentication tag to verify an integrity of the block of instructions so as to ensure that an attacker has not modified or tampered with the block of instructions. As another example, security controller 212 may perform cryptographic authentication of the authentication tag to verify a source of the block of instructions so as to ensure that the block of instructions originated from a source (e.g., a person or entity) that is authorized to provide instructions to the processor for execution. In some examples, the authentication tag is a digital signature created with a private cryptographic key that the security controller may cryptographically authenticate with a corresponding public cryptographic key. For example, one may apply a cryptographic function to a private cryptographic key and the block of register words to get a resultant digital signature, which may be used as the authentication tag. Security controller 212 may validate the digital signature with a public cryptographic key to demonstrate that the authentication tag is genuine and that the block of register words has not been modified. If an attacker submits a set of unauthorized instructions, security controller 212 may be unable to cryptographically authenticate an authentication tag for the unauthorized instructions with the public cryptographic key, and therefore may prevent execution of such unauthorized instructions by processor 302. Typically, the authentication tag is a value that has a bitlength equal to a length of a microprocessor instruction. For example, where processor 302 has an instruction set length of 32 bits, the authentication tag may comprise a 32 bit digital signature created with a private cryptographic key that the SoC may cryptographically authenticate with a corresponding public cryptographic key.

In an alternative implementation, to minimize overhead latency, processor 302 may execute the instructions of the block of register words concurrently with verification of the authentication tag by security controller 212. Instead of using a public-private key strategy, security controller 212 may use an AES key. In this example, security controller 212 generates the authentication tag in 1 clock cycle, and causes processor 302 to pause execution of the instructions of the block of register words in response to determining that the authentication tag mismatches (e.g., the authentication tag specified by the block of register words does not match a value expected by security controller 212).

In response to successfully authenticating the authentication tag ("YES" block of 708), security controller 212 forwards the one or more instructions of the block of register words to processor 302 for execution (712). Processor 302 executes the one or more instructions of the block of register words (714).

In response to unsuccessfully authenticating the authentication tag ("NO" block of 708), security controller 212 blocks the one or more instructions of the block of register words from execution by processor 302 (710). In some examples, in response to determining that the authentication tag may not be authenticated, security controller 212 may trigger an interrupt request. The interrupt request may cause processor 302 to execute alternate instructions or code, perform error logging, stop execution by processor 302 and/or SoC 2, transmit diagnostic data to an external device, or reboot processor 302 and/or HMD 112, perform a factory reset of SoC 2, etc.

The following examples may illustrate one or more aspects of the disclosure.

Example 1. An SoC comprising: a ROM configured to store a block of register words, wherein the block of register words comprises a first register word specifying an authentication tag and one or more register words that each specify an instruction; a security controller configured to: identify the first register word as specifying the authentication tag; in response to identifying the first register word as specifying the authentication tag, perform authentication of the authentication tag; and in response to successfully performing authentication of the authentication tag, forward the one or more register words that each specify an instruction for execution by the processor; and the processor configured to execute the one or more register words received from the security controller.

Example 2. The SoC of example 1, wherein the security controller is further configured to block, in response to unsuccessfully performing authentication of the authentication tag, the one or more register words that each specify an instruction from execution by processor.

Example 3. The SoC of any of examples 1 through 2, wherein the block of register words comprises a dynamic number of register words, wherein each register word of the block further comprises a flag indicative of whether the register word specifies the instruction or the authentication tag, and wherein to identify the first register word as specifying the authentication tag, the security controller is configured to determine, based on the tag of the first register word, that the first register word specifies the authentication tag.

Example 4. The SoC of example 3, wherein the flag of each register word comprises 2 bits, wherein a flag of '10' indicates that the register word comprises an instruction and is the beginning of the block of register words, wherein a flag of '01' indicates that the register word comprises an instruction and is the continuation of the block of register words, wherein a flag of '11' indicates that the register word comprises the authentication tag, and wherein a flag of '00' indicates that the security controller is to bypass the authentication tag for the block of register words.

Example 5. The SoC of any of examples 1 through 4, wherein the block of register words comprises a fixed number of register words, wherein the first register word is stored at a predetermined address of the ROM, and wherein to identify the first register word as specifying the authentication tag, the security controller is configured to retrieve, from the predetermined address of the first register word, the first register word.

Example 6. The SoC of example 5, wherein the ROM comprises a plurality of transistors arranged in a sea-of-gates configuration, wherein the SoC is configured to program the plurality of transistors with the first register word specifying the authentication tag and the one or more register words that each specify an instruction.

Example 7. The SoC of any of examples 1 through 6, wherein to perform authentication of the authentication tag, the security controller comprises a Galois Hash (GHASH) engine configured to perform authentication of the authentication tag.

Example 8. The SoC of any of examples 1 through 7, wherein the authentication tag comprises a digital signature created with a private cryptographic key; and wherein to perform cryptographic authentication of the authentication tag, the security controller is configured to perform cryptographic authentication of the digital signature with a public cryptographic key.

Example 9. The SoC of any of examples 1 through 8, wherein a head-mounted device (HMD) comprises the SoC.

Example 10. A method comprising: storing, in a ROM of an SoC, a block of register words, wherein the block of register words comprises a first register word specifying an authentication tag and one or more register words that each specify an instruction; identifying, by a security controller of the SoC, the first register word as specifying the authentication tag; in response to identifying the first register word as specifying the authentication tag, performing, by the security controller, authentication of the authentication tag; in response to successfully performing authentication of the authentication tag, forwarding, by the security controller, the one or more register words that each specify an instruction for execution by the processor; and executing, by the processor, the one or more register words received from the security controller.

Example 11. The method of example 10, further comprising blocking, by the security controller and in response to unsuccessfully performing authentication of the authentication tag, the one or more register words that each specify an instruction from execution by the processor.

Example 12. The method of any of examples 10 through 11, wherein the block of register words comprises a dynamic number of register words, wherein each register word of the block further comprises a flag indicative of whether the register word specifies the instruction or the authentication tag, and wherein identifying the first register word as specifying the authentication tag comprises determining, based on the tag of the first register word, that the first register word specifies the authentication tag.

Example 13. The method of example 12, wherein the flag of each register word comprises 2 bits, wherein a flag of '10' indicates that the register word comprises an instruction and is the beginning of the block of register words, wherein a flag of '01' indicates that the register word comprises an instruction and is the continuation of the block of register words, wherein a flag of '11' indicates that the register word comprises the authentication tag, and wherein a flag of '00' indicates that the security controller is to bypass the authentication tag for the block of register words.

Example 14. The method of any of examples 10 through 13, wherein the block of register words comprises a fixed number of register words, wherein the first register word is stored at a predetermined address of the ROM, and wherein identifying the first register word as specifying comprises retrieving, from the predetermined address of the first register word, the first register word.

Example 15. The method of example 14, wherein the ROM comprises a plurality of transistors arranged in a sea-of-gates configuration, wherein the method further comprises programming the plurality of transistors with the first register word specifying the authentication tag and the one or more register words that each specify an instruction.

Example 16. The method of any of examples 10 through 15, wherein performing authentication of the authentication tag comprises performing, by a Galois Hash (GHASH) engine of the security controller, authentication of the authentication tag.

Example 17. The method of any of examples 10 through 16, wherein the authentication tag comprises a digital signature created with a private cryptographic key; and wherein performing authentication of the authentication tag comprises performing cryptographic authentication of the digital signature with a public cryptographic key.

Example 18. The method of any of examples 10 through 17, wherein storing, in the ROM, the block of register words comprises storing, in a ROM of a head-mounted device (HMD).

Example 19. A head-mounted display comprising: an SoC comprising: a ROM configured to store a block of register words, wherein the block of register words comprises a first register word specifying an authentication tag and one or more register words that each specify an instruction; a security controller configured to: identify the first register word as specifying the authentication tag; in response to identifying the first register word as specifying the authentication tag, perform authentication of the authentication tag; and in response to successfully performing authentication of the authentication tag, forward the one or more register words that each specify an instruction for execution by the processor; and the processor configured to execute the one or more register words received from the security controller.

Example 20. The system of example 19, wherein the security controller is further configured to block, in response to unsuccessfully performing authentication of the authentication tag, the one or more register words that each specify an instruction from execution by the processor.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A System on a Chip (SoC) integrated circuit comprising:
a read-only memory (ROM) configured to store a block of register words, wherein the block of register words comprises a first register word specifying an encrypted authentication tag and a plurality of register words that each specify a respective instruction;
a processor configured to execute the plurality of register words that each specify the respective instruction; and
a security controller configured to:
identify the first register word as specifying the encrypted authentication tag;
in response to identifying the first register word as specifying the encrypted authentication tag, perform cryptographic authentication of the encrypted authentication tag to verify A) an integrity of the block of register words by verifying that the block of register words as stored in the ROM is unmodified after being initially stored in the ROM, and/or B) that the block of register words as stored in the ROM originates from an authorized source, other than the ROM; and
in response to successfully performing cryptographic authentication of the encrypted authentication tag, forward the plurality of register words that each specify the respective instruction for execution by the processor.

2. The SoC integrated circuit of claim 1, wherein the security controller is further configured to block, in response to unsuccessfully performing cryptographic authentication of the encrypted authentication tag, the plurality of register words that each specify the respective instruction from execution by the processor.

3. The SoC integrated circuit of claim 1,
wherein the block of register words comprises a dynamic number of register words,
wherein each respective register word of the block further comprises a flag indicative of whether the respective register word of the block specifies the instruction or the encrypted authentication tag, and
wherein to identify the first register word as specifying the encrypted authentication tag, the security controller is configured to determine, based on the flag of the first register word, that the first register word specifies the encrypted authentication tag.

4. The SoC integrated circuit of claim 3,
wherein the flag of each respective register word of the block comprises 2 bits,
wherein a flag of '10' indicates that a respective register word of the block comprises an instruction and is the beginning of the block of register words,
wherein a flag of '01' indicates that a respective register word of the block comprises an instruction and is the continuation of the block of register words,
wherein a flag of '11' indicates that a respective register word of the block comprises the encrypted authentication flag, and
wherein a flag of '00' indicates that the security controller is to bypass the encrypted authentication tag for the block of register words.

5. The SoC integrated circuit of claim 1,
wherein the block of register words comprises a fixed number of register words,
wherein the first register word is stored at a predetermined address of the ROM, and
wherein to identify the first register word as specifying the encrypted authentication tag, the security controller is configured to retrieve, from the predetermined address of the first register word, the first register word.

6. The SoC integrated circuit of claim 1, wherein to perform cryptographic authentication of the encrypted authentication tag, the security controller comprises a Galois Hash (GHASH) engine configured to perform cryptographic authentication of the encrypted authentication tag.

7. The SoC integrated circuit of claim 1,
wherein the encrypted authentication tag comprises a digital signature created with a private cryptographic key, and
wherein to perform cryptographic authentication of the encrypted authentication tag, the security controller is configured to perform cryptographic authentication of the digital signature with a public cryptographic key.

8. The SoC integrated circuit of claim 1, wherein a head-mounted device (HMD) comprises the SoC integrated circuit.

9. The SoC integrated circuit of claim 1, wherein the authorized source is external to the SoC integrated circuit.

10. The SoC integrated circuit of claim 1, wherein the security controller is configured to authenticate the encrypted authentication tag by verifying both A) the integrity of the block of register words by verifying that the block of register words as stored in the ROM is unmodified after being initially stored in the ROM, and B) that the block of register words as stored in the ROM originates from the authorized source.

11. A method comprising:
storing, in a read-only memory (ROM) of a System on a Chip (SoC) integrated circuit, a block of register words, wherein the block of register words comprises a first register word specifying an encrypted authentication tag and a plurality of register words that each specify a respective instruction for execution by a processor;
identifying, by a security controller of the SoC integrated circuit, the first register word as specifying the encrypted authentication tag;
in response to identifying the first register word as specifying the encrypted authentication tag, performing, by the security controller, cryptographic authentication of the encrypted authentication tag to verify A) an integrity of the block of register words by verifying that the block of register words as stored in the ROM is unmodified after being initially stored in the ROM, and/or B) that the block of register words as stored in the ROM originates from an authorized source, other than the ROM;
in response to successfully performing cryptographic authentication of the encrypted authentication tag, forwarding, by the security controller, the plurality of register words that each specify the respective instruction for execution by the processor; and
executing, by the processor, the plurality of register words received from the security controller.

12. The method of claim 11, further comprising blocking, by the security controller and in response to unsuccessfully performing cryptographic authentication of the encrypted authentication tag, the plurality of register words that each specify the respective instruction from execution by the processor.

13. The method of claim 11,
wherein the block of register words comprises a dynamic number of register words,
wherein each respective register word of the block further comprises a flag indicative of whether the respective register word of the block specifies the instruction or the encrypted authentication tag, and
wherein identifying the first register word as specifying the encrypted authentication tag comprises determining, based on the flag of the first register word, that the first register word specifies the encrypted authentication tag.

14. The method of claim 13,
wherein the flag of each respective register word of the block comprises 2 bits,
wherein a flag of '10' indicates that a respective register word of the block comprises an instruction and is the beginning of the block of register words,
wherein a flag of '01' indicates that a respective register word of the block comprises an instruction and is the continuation of the block of register words,
wherein a flag of '11' indicates that a respective register word of the block comprises the encrypted authentication flag, and
wherein a flag of '00' indicates that the security controller is to bypass the encrypted authentication tag for the block of register words.

15. The method of claim 11,
wherein the block of register words comprises a fixed number of register words,
wherein the first register word is stored at a predetermined address of the ROM, and
wherein identifying the first register word as specifying the encrypted authentication tag comprises retrieving, from the predetermined address of the first register word, the first register word.

16. The method of claim 11, wherein performing cryptographic authentication of the encrypted authentication tag comprises performing, by a Galois Hash (GHASH) engine of the security controller, cryptographic authentication of the encrypted authentication tag.

17. The method of claim 10,
wherein the encrypted authentication tag comprises a digital signature created with a private cryptographic key, and
wherein performing cryptographic authentication of the encrypted authentication tag comprises performing cryptographic authentication of the digital signature with a public cryptographic key.

18. The method of claim 10, wherein storing, in the ROM, the block of register words comprises storing the block of register words in a ROM of a head-mounted device (HMD).

19. A head-mounted display (HMD) system comprising:
a read-only memory (ROM) configured to store a block of register words, wherein the block of register words comprises a first register word specifying an encrypted authentication tag and one or more register words that each specify a respective instruction; and
a System on a Chip (SoC) integrated circuit comprising:
a processor configured to execute the one or more register words that each specify the respective instruction; and
a security controller configured to:
identify the first register word as specifying the encrypted authentication tag;
in response to identifying the first register word as specifying the encrypted authentication tag, perform cryptographic authentication of the encrypted authentication tag to verify A) an integrity of the block of register words by verifying that the block of register words as stored in the ROM is unmodified after being initially stored in the ROM, and/or B) that the block of register words as stored in the ROM originates from an authorized source, other than the ROM; and in response to successfully performing cryptographic authentication of the encrypted authentication tag, forward the one or more register words that each specify the respective instruction for execution by the processor.

20. The HMD system of claim 19, wherein the Security controller is further configured to block, in response to unsuccessfully performing cryptographic authentication of the encrypted authentication tag, the one or more register words that each specify the respective instruction from execution by the processor.

* * * * *